United States Patent Office 3,642,921
Patented Feb. 15, 1972

3,642,921
MANUFACTURE OF 1,2-DICHLOROETHANE
John H. McCarthy and Andrew O. Wikman, Baton Rouge, La., assignors to Ethyl Corporation, New York, N.Y.
No Drawing. Continuation-in-part of application Ser. No. 127,793, July 31, 1961. This application May 29, 1967, Ser. No. 642,234
Int. Cl. C07c 17/02
U.S. Cl. 260—659 A   4 Claims

ABSTRACT OF THE DISCLOSURE

A split-feed oxychlorination process conducted by admitting oxygen and hydrogen chloride to the bottom of a fluidized reaction zone and ethylene to the zone at a location substantially above the bottom, under conditions such that the reactants form 1,2-dichloroethane.

CROSS-REFERENCES TO RELATED APPLICATIONS

This application is a continuation-in-part of application Ser. No. 127,793, filed July 31, 1961, now Pat. No. 3,177,155.

BACKGROUND OF THE INVENTION

The prior art discloses the manufacture of 1,2-dichloroethane by reaction of ethylene, hydrogen chloride and oxygen. In the disclosed process ethylene, hydrogen chloride and oxygen are mixed together and fed into the bottom of a vertical reactor containing a fluidized bed. The bed consists of fluidized catalytic particles suspended in space by the flow of entering gases. The fluidized particles consist of inert particles upon which is supported a variable valence oxychlorination catalyst, for example, copper chloride.

In prior art processes ethylene is converted to 1,2-dichloroethane, though in such processes a considerable amount of the ethylene is converted to oxidation products of ethylene. The oxidation of ethylene is very undesirable since not only is a lower yield of 1,2-dichloroethane obtained from the reaction but, even more importantly, such waste of ethylene detracts greatly from the economics of the process.

It is accordingly an object of the present invention to obviate the foregoing and other difficulties and to advance the state of the art by providing a new and improved process for the oxychlorination of ethylene.

SUMMARY

The present invention relates to a process for the manufacture of 1,2-dichloroethane within a fluidized reaction zone from the reactants, oxygen, hydrogen chloride and ethylene, the improvement comprising feeding oxygen and hydrogen chloride into the bottom of the reaction zone and feeding ethylene into said reaction zone at a location substantially above said bottom of said reaction zone.

DESCRIPTION OF THE PREFERRED EMBODIMENTS

The present invention primarily concerns improving the oxychlorination of ethylene process by providing a split-feed to the reaction zone. Thus, while pursuant to past practice in manufacturing 1,2-dichloroethane, ethylene, hydrogen chloride, and air have been fed together into the lower portion of a reaction zone, it has now been discovered that ethylene oxidation can be greatly reduced by feeding the ethylene into the reaction zone at a different location from that whereat the hydrogen chloride and air are fed or contacted together.

Pursuant to the present invention, 1,2-dichloroethane can be produced from ethylene in high yields without excessive ethylene oxidation by providing a split-feed of the reactants, ethylene, hydrogen chloride and oxygen, into a fluidized reaction bed at reaction conditions. Accordingly, ethylene can be fed into a location substantially above the bottom of the fluidized bed while oxygen and hydrogen chloride are fed into and brought together in the lower portion of the fluidized bed; by "substantially" it is meant to include greater than infinitesimal distances. As a slight modification to the present split-feed technique, hydrogen chloride can be mixed with oxygen prior to being introduced to the bottom of the bed; air is found to be an ideal source of the oxygen reactant.

The novel features of the present invention result in numerous unobvious advantages not realized by the processes of the prior art. By the present invention it is possible to (1) keep hydrogen chloride corrosion very low, (2) maintain quality fluidization of a fluidized bed although using a split-feed technique and (3) maintain optimum yields by preventing excessive oxidation of the hydrocarbon.

In the process of oxychlorination, hydrogen chloride corrosion is a particularly acute problem. Lines conducting hydrogen chloride to the reactor must be frequently replaced, and this is costly both in the expense of replacement and in lost production. Hydrogen chloride corrosion is most severe when the hydrogen chloride is cold and a small amount of moisture is present. Fortunately, in oxychlorination, when air is used or an oxygen carrier, the air stream is heated since it is compressed without being cooled. According to the present invention, the air and hydrogen chloride streams may be admitted together, thereby raising the temperature of the hydrogen chloride and significantly reducing corrosion. This is a considerable advantage over prior art processes wherein the hydrocarbon and hydrogen chloride streams are admitted together.

When using a split feed technique, it is difficult to maintain quality fluidization of the fluidized bed. A fluidized bed is maintained by forcing a vapor stream vertically up through the bed. A vapor stream simultaneously entering at the side of the reactor can destroy, either partially or totally, the balance of the fluidized bed and severely reduce the quality of fluidization. Needless to say, this has a very detrimental effect upon conversions and yields. By the present invention the smallest of the three feed streams, the hydrocarbon, is introduced at the side of the reactor and may be distributed by means of ring spargers. This has the least adverse effect upon the quality of fluidization. On the other hand, in some prior art processes, the larger stream, air, is introduced at the side. Clearly, the present invention here realizes a significant advantage over prior art processes.

The present invention also insures by its novel process a third significant advantage over the prior art processes. As is well known, an increased contact time between the hydrocarbon and the fluidized bed decreases yields inasmuch as there is a longer period in the hot bed during which the hydrocarbon may be oxidized to undesired by-products. Therefore, it is desirable to have the hydrocarbon in the bed no longer than the time required for the reaction. This time is exceeded where the hydrocarbon is introduced at the bottom of the reactor and must travel up the hot bed to the level at which oxygen is introduced before the desired reaction begins. According to the present invention, the hydrocarbon is able upon entry into the reactor to immediately react with the other components flowing up from the bottom of the bed.

The following illustrative and non-limiting examples and demonstrations show that when operating in accordance with the process described, not only is the yield of 1,2-dichloroethane increased, but also ethylene oxidation is significantly reduced. Thus, it will be observed in the following examples and demonstrations that 1,2-dichloroethane yield is considerably increased, and ethylene oxidation reduced by more than 250 percent pursuant to the practice of this invention. In the following examples all parts are in weight units, temperature in degrees centigrade, pressure in pounds per square inch gauge (p.s.i.g.), and concentration of reactants in stoichiometric proportions or stoichiometric ratios, except as otherwise specified. By stoichiometric proportions or stoichiometric ratios is meant that hydrogen chloride, ethylene and air are fed into the reaction in such molar quantities that, on a theoretical basis the reaction being considered as complete, sufficient air is present to provide sufficient oxygen to completely oxidize two moles of hydrogen chloride to liberate sufficient chlorine to convert one mole of ethylene to one mole of 1,2-dichloroethane. Thus, the reactants hydrogen chloride, ethylene and oxygen, respectively, combine in the molar proportions of 2:1:0.5, or where hydrogen chloride, ethylene and air are employed, in the proportions of 2:1:2.38, these ratios of hydrogen chloride:ethylene:oxygen or hydrogen chloride:ethylene:air, respectively, being 1:1:1 when expressed in stoichiometric porportions.

In all of the following examples and demonstrations there was employed a cylindrically-shaped vertically standing reactor containing a bed of catalytic particles maintained in fluidized condition by the entry of reactant gases. The diameter of the fluidized bed was defined by the inside vertical walls of the reactor. At the top of the reactor was a disengaging section, and at the bottom of the reactor was a feed plate. The feed plate separated the fluidized bed from the lower portion of the reactor wherein entered the gases fed into the lower portion of the reactor. Where a gas was fed into the upper portion of the reactor, the gas was fed directly into the fluid bed at a point or location above the feed plate.

EXAMPLE I

A gaseous mixture of hydrogen chloride and air in the stoichiometric ratio of hydrogen chloride:air of 1:1.08 was fed into the bottom of a reactor containing a fluidized catalytic bed consisting essentially of a catalytic mixture of copper chloride and rare earth chlorides deposited on alumina. The rare earth chlorides were obtained by treatment of monazite sand after removal of thorium. The rare earth chloride mixture consisted essentially of the chlorides of cerium, praseodymium, neodymium, lanthanum, samarium, ytterbium and yttrium. The reactor was operated at a temperature of 275° C. and at a pressure of 75 pounds per square inch gauge.

At a location above the feed plate and at the lower extremity of the vertical reactor, approximately one-tenth of the linear distance from the top of the feed plate, or bottom of the fluidized bed, to the top of the fluidized bed was fed a stream of ethylene in a stoichiometric ratio of ethylene:air of 1.04:1.08.

Under these conditions of operation a very high percentage of the ethylene was converted to 1,2-dichloroethane and only a small amount of ethylene was oxidized into carbon monoxide, carbon dioxide and other products. Hydrogen chloride conversion was quite high. In fact, in this example only approximately 3.4 moles of ethylene was oxidized per 100 moles of 1,2-dichloroethane produced.

In sharp contrast to the foregoing example, the following demonstration shows a run not of this invention wherein all of the reactants are fed together into the bottom of the reactor. As will be seen, although the conditions of operation were substantially the same as in Example I, a lower yield of 1,2-dichloroethane was obtained and greater ethylene oxidation occurred. In fact, a 20 percent greater yield of 1,2-dichloroethane was obtained in Example I than in the following demonstration, and the amount of undesirable ethylene oxidation was only about 37 percent as much as in the following demonstration.

When Example I was repeated in all details except that hydrogen chloride, ethylene and air, in stoichiometric proportions of hydrogen chloride:ethylene:air of 1:1.02:1.2, were fed together into the bottom of the fluidized bed, the conversion of ethylene to 1,2-dichloroethane was only 80 percent as much as in Example I and a considerable amount of the ethylene was converted to oxidation products. In fact, 9.3 moles of ethylene per 100 moles of 1,2-dichloroethane produced was converted into useless oxidation products whereas only 3.4 moles of ethylene per 100 moles of 1,2-dichloroethane was oxidized in Example I.

The conditions given in Example II, infra, are the same as Example I, supra, except as specified.

EXAMPLE II

Into a fluidized bed contained within a reaction zone operated at 300° C. and 100 p.s.i.g. were fed hydrogen chloride, ethylene and air at a stoichiometric ratio of hydrogen chloride:ethylene:air of 1:1.035:0.975. The hydrogen chloride and air were fed into the bottom of the reactor and the ethylene directly into the fluidized bed at a location in the upper portion of the reactor.

A high conversion of ethylene and hydrogen chloride to 1,2-dichloroethane was obtained and only a small porportion of the ethylene was converted to the undesirable oxidation products.

When the foregoing Example II was repeated in all details except that all of the reactants were fed together into the bottom of the reactor at a stoichiometric ratio of hydrogen chloride; ethylene:air of 1:1.080:0.928 a much lower conversion of the ethylene to 1,2-dichloroethane occurred and a considerable amount of the ethylene was converted to useless oxidation products.

In fact the results of the aforesaid demonstration are in sharp contrast to the results obtained in Example II. In Example II, only 3.2 moles of the ethylene per 100 moles of 1,2-dichloroethane produced was converted to useless oxidation products whereas in the comparative run 8.13 moles of the ethylene per 100 moles of 1,2-dichloroethane produced was converted to useless oxidation products. In other words, over 250 percent more ethylene was wasted in this demonstration than in Example II. Furthermore, only 73 percent as much 1,2-dichloroethane product was obtained in this demonstration as was obtained in Example II. In addition, only 78 percent as much hydrogen chloride conversion was obtained in this demonstration as compared with Example II.

Example III, infra, illustrates high conversions of ethylene to 1,2-dichloroethane with low ethylene oxidation even under more drastic conditions than imposed in the foregoing examples. Conditions are again the same as in Example I, supra, except as specified.

EXAMPLE III

To a reactor containing a fluidized bed were passed hydrogen chloride, ethylene, and air in stoichiometric proportions of hydrogen chloride:ethylene:air of 1:1.1:1.09. The ethylene was fed directly into the fluidized bed through an opening in the upper portion of the reactor. The opening was located at a site about midway the vertical height of the fluidized bed. The hydrogen chloride and air were fed into the bottom of the reactor. The reactor was operated at a temperature of 330° C. and at 100 p.s.i.g.

A high percentage of the ethylene and hydrogen chloride was converted into 1,2-dichloroethane and only a very small amount of the ethylene was degraded to oxidation products.

While the present invention has been defined with regard to an oxychlorination process, it is also equally applicable to an oxybromination process. Thus, while the oxybromination of ethylene does not present as acute a problem, particularly with regard to ethylene oxidation, as encountered in the oxychlorination of ethylene, the present invention is nevertheless likewise applicable to oxybromination reactions and similar benefits are obtained, even though the contrast is not as sharp as when comparing a split-feed oxybromination of ethylene process with a process not utilizing the split-feed.

EXAMPLE IV

Examples I through III are repeated except that hydrogen bromide is substituted for the hydrogen chloride feed and cupric bromide is employed as the impregnating catalytic material. Ethylene oxidation is significantly reduced and good yields of 1,2-dibromomethane are obtained as contrasted with similar runs wherein the split-feed technique is not employed.

Suitable catalysts for use in the present process include mixtures of first and second transition metal halides and rare earth metal halides. Small amounts or even trace amounts of these mixtures can affect the desired results because of the catalytic nature of the mixture, but it is nevertheless more desirable to provide a concentration of from about 0.1 percent to about 30 percent of the catalytic mixture, based on the total weight of the catalyst mixture and support. Greater concentrations than 30 percent of the catalytic mixtures can be employed upon the inert carrier but the catalyst generally becomes "sticky" and produces agglomerates. This condition is not desirable. For very good results, the catalyst mixture should be maintained within a range of from about 2 percent to about 25 percent, and for best results, between about 6 percent and about 15 percent. The concentration of the rare earth halides within the catalytic mixture should preferably not be greater than about one-half the weight of the total weight of the catalytic mixture, exclusive of the weight of the carrier, for best results. A concentration of the rare earth halides within the catalytic mixture is preferably from about 0.1 to about 0.5 percent, based on the total weight of the catalyst mixture and support.

While any of a wide variety of inert carriers can be employed, the preferred support or carrier for use in this invention is one composed of granular alumina having a relatively low surface area, i.e., an area not exceeding about 300 square meters per gram of carrier, prior to impregnation with the catalytic mixture. The surface area is further decreased by impregnation with the catalytic mixture. Preferably, the surface area is from about 1 to about 300 square meters, per gram of alumina. In the most preferred embodiment, there is employed a granular alumina having a surface area of from about 1 to about 250 square meters per gram of alumina, prior to impregnation. Other inert carriers which can be employed are those composed of pumice, burnt clay, silica gel, and the like.

While the catalytic mixtures of this invention can be deposited upon the inert carrier in a number of different ways, a very simple and highly preferred method of impregnating the support is to dissolve in water a weighed amount of the components of the catalyst mixture. A weighed amount of the support is then added to the water, and the contents are stirred until completely homogeneous. The water is then evaporated at low temperature from the so-formed slurry. The evaporation is conveniently executed by drying at a low temperature, e.g., about 100° C., in an air circulating oven. The dry impregnated carrier remaining can thus be employed in the process of this invention.

While the particle size of the catalyst can be of any dimension which can be fluidized, it is generally preferable that the size distribution be predominantly within a range of from about 120 mesh to about 325 mesh (U.S. Sieve No.). In other words, the preponderance of the catalytic material be no coarser than about 120 mesh and no finer than about 325 mesh. Of course, it is realized that it is not necessary nor is it practical that all of the particles be of uniform size. The size distribution varies throughout the range indicated.

For use in forming the catalytic mixtures of this invention rare earth halides, or a rare earth halide, can be admixed with any one or more of a very wide variety of oxyhalogenation catalysts. Such oxyhalogenation catalysts are taught in the art, one of the best and most effective being the copper halides, such as cupric chloride for oxychlorination. The preferred catalysts for admixing with the rare earth halides are halides of the first and second series of transition metals, or those transition metals having an atomic number of from 21 through 48. Halides of such variable valence metals include, for example, the chlorides, and bromides of zinc, nickel, cobalt, iron, manganese, chromium, vanadium, titanium, zirconium, niobium, molybdenum, technetium, ruthenium, rhodium, palladium, indium and the like. Thus, suitable oxyhalogenation catalysts are the halides of any of the variable oxidation first and second series of transition metals. Oxides of these metals are also effective, it being thought that the oxyhalogenation is a cyclic process wherein halides and oxides of the transition metal are formed, although the present invention is not limited to this theory.

The transition metals hereinreferred to are as given in Groups III-B, IV-B, V-B, VI-B, VII-B, VIII, I-B and II-B of the Periodic Chart of the Elements having an atomic number of from 21 throughout 48 and the rare earth metals referred to are those metals given in the Lanthanum Series of the Periodic Chart of the Elements, these metals having an atomic number of from 57 through 71. The Periodic Chart referred to is Periodic Chart of the Elements, Copyright 1955 by Fisher Scientific Company.

The rare earth halide component of the catalytic mixture comprises halides, preferably bromides, chlorides, or oxides, of one or more of any of the elements of the rare earth group, e.g., those elements having an atomic number of from 57 through 71. The rare earth group thus includes such metals as cerium, praseodymium, neodymium, lanthanum, prometheum, samarium, europium, gadolinium, terbium, dysprosium, holmium, erbium ytterbium, lutecium, yytrium, and the like. A highly suitable mixture of such halides is one containing the halides of cerium, praseodymium, neodymium, lanthanum, samarium, ytterbium and yttrium. While mixtures of rare earth halides are preferred in the practice of this invention any rare earth halide can be employed alone or in admixture with a transition metal halide. Where mixtures of rare earth halides are employed, they can be used in any proportion, one with respect to the other.

Another highly desirable catalytic mixture is that formed by adding an alkali-metal halide or alkaline-earth metal halide to the transition metal halide-rare earth halide catalytic mixture. While any alkali-metal halide or alkaline-earth metal halide can be employed, e.g., the bromides and chlorides of lithium, rubidium, magnesium, barium, calcium and the like, the preferred are the halides of potassium and sodium. These compounds are thought to aid the transition metal halides in promoting halogenation, although the present invention is not limited to this theory.

Any suitable oxidizing agent can be used in this invention, although the preferred is oxygen, or oxygen-containing gases, such as air. Illustrative of other oxidizing agents which are considered the equivalents of oxygen are sulfur dioxide, nitric acid, manganese dioxide, manganese peroxide, potassium perchlorate, potassium chromate, oxides of lead such as lead dioxide, nitrogen tetoxide and the like.

Pursuant to the practice of this invention a fluidized catalyst bed is employed within a reaction zone. A superficial linear velocity of from about 0.2 feet per second to about 2 feet per second through the fluid bed is generally employed, and preferably a superficial linear velocity of from about 0.2 feet per second to about 1.5 feet per second is employed. A superficial linear velocity of from about 0.5 to about 1.2 feet per second has been found to provide excellent results.

Although the invention has been particularly described for use in making 1,2-dichloroethane by oxychlorination of ethylene, the present process is also applicable to manufacture of 1,2-dibromoethane- from ethylene. Thus, hydrogen halides, the halogen portion of which has an atomic number of from 17 to 35, can be oxyhalogenated in the presence of ethylene to yield the dihalogenated product persuant to the practice of the present invention.

It is to be understood that the invention is not limited by the specific examples and embodiments described hereinabove, but includes such changes and modifications as may be apparent to one skilled in the art upon reading the appended claims.

What is claimed is:

1. In a process for the manufacture of 1,2-dichloroethane within a fluidized bed reaction zone from the reactants oxygen, hydrogen chloride and ethylene, the improvement comprising feeding oxygen and hydrogen chloride into the bottom of the reaction zone and feeding ethylene into said reaction zone at a location substantially above said bottom of said reaction zone.

2. The process of claim 1 wherein said oxygen is supplied by air.

3. The process of claim 1 wherein said oxygen and hydrogen chloride are combined prior to being admitted to said bottom of said reaction zone.

4. The process of claim 1 wherein said oxygen is supplied by air and said air and hydrogen chloride are combined prior to being admitted to said bottom of said reaction zone.

References Cited

UNITED STATES PATENTS

| | | | |
|---|---|---|---|
| 2,644,846 | 7/1953 | Johnson et al. | 260—659 OXY |
| 2,746,844 | 5/1956 | Johnson et al. | 260—659 OXY |
| 2,752,401 | 6/1956 | Joseph | 260—659 OXY |
| 2,783,286 | 2/1957 | Reynolds | 260—659 OXY |
| 2,870,225 | 1/1959 | Cooley et al. | 260—662 A |
| 3,210,431 | 10/1965 | Engel | 260—659 OXY |
| 3,267,162 | 8/1966 | Bohl | 260—659 OXY |
| 3,296,319 | 1/1967 | Bohl et al. | 260—659 OXY |

LEON ZITVER, Primary Examiner

J. A. BOSKA, Assistant Examiner

UNITED STATES PATENT OFFICE
CERTIFICATE OF CORRECTION

Patent No. 3,642,921    Dated February 15, 1972

Inventor(s) John H. McCarthy et al.

It is certified that error appears in the above-identified patent and that said Letters Patent are hereby corrected as shown below:

Column 1, line 24, "filed July 31, 1961, now Pat. No. 3,177,155" should read -- filed July 31, 1961, now abandoned --. Column 5, line 13, "1,2-dibromomethane" should read -- 1,2-dibromoethane --.

Signed and sealed this 7th day of November 1972.

(SEAL)
Attest:

EDWARD M. FLETCHER, JR.
Attesting Officer

ROBERT GOTTSCHALK
Commissioner of Patents